United States Patent [19]
Schaffstein et al.

[11] Patent Number: 6,140,994
[45] Date of Patent: Oct. 31, 2000

[54] GRAPHICS CONTROLLER FOR FORMING A COMPOSITE IMAGE

[75] Inventors: Michael J. Schaffstein, Newton; Christopher Walsh, Arlington, both of Mass.

[73] Assignee: Philips Electronics N.A. Corp., New York, N.Y.

[21] Appl. No.: 08/968,679

[22] Filed: Nov. 12, 1997

[51] Int. Cl.[7] .................................................. G09G 5/00
[52] U.S. Cl. ......................................... 345/115; 345/149
[58] Field of Search .................................. 345/113, 110, 345/125, 326, 340, 114–115, 117, 136, 339, 470, 471, 467, 149, 138, 147, 150, 152

[56] References Cited

U.S. PATENT DOCUMENTS

| | | | |
|---|---|---|---|
| 4,958,146 | 9/1990 | Priem et al. . | |
| 5,130,704 | 7/1992 | Ogawa et al. . | |
| 5,634,850 | 6/1997 | Kitahara et al. | 463/33 |
| 5,644,333 | 7/1997 | King et al. | 345/115 |
| 5,793,439 | 8/1998 | Takeuchi | 348/584 |
| 5,812,117 | 9/1998 | Moon | 345/169 |
| 5,831,590 | 11/1998 | Ikedo | 345/113 |
| 5,861,871 | 1/1999 | Venable | 345/150 |

OTHER PUBLICATIONS

"Programmable Boolean Function Generator", by F.E. Sakalay, IBM Technical Disclosure Bulletin, vol. 21, No. 6, pp. 2474–2475, Nov. 1, 1978.

*Primary Examiner*—Steven Sax

[57] ABSTRACT

A graphics controller produces a composite image through selecting between input image pixels, which are designated to be displayed in the same pixel location, by using a select function. The select function is computed on a pixel by pixel basis to provide a select signal that indicates which pixel should be chosen for display as the final composite image on the display screen. The select signal uses mixing key functions to determine which pixel should be passed. The results of these functions are output in the form of key codes. Key codes are combined by performing a logical AND operation between the key codes, and with a Raster OPeration (ROP) code. The ROP code designates which key code combinations are to be logically ORed together to provide an increased number of possible key combinations to determine the selection of the image to be displayed.

17 Claims, 3 Drawing Sheets

GRAPHICS CONTROLLER FOR FORMING A COMPOSITE IMAGE

FIELD OF THE INVENTION

The present invention relates generally to graphics controllers, and more particularly to a graphics controller for graphical user interfaces that combines multiple images into a single composite image.

BACKGROUND OF THE INVENTION

The output devices of computers often include bitmap graphics devices. A bitmap graphics device typically includes a graphics adapter, which has a display memory, and a display screen. The bitmap graphics device inputs a bitmap to be displayed and then displays that bitmap on the display screen. A bitmap is a matrix of bits that defines an image that is to be displayed in a rectangular area on a display screen. Each bit in a bitmap corresponds to one picture element (pixel) on the display screen. To display computer output data, a bitmap graphics device reads the bitmap stored in the display memory and renders the corresponding image on the display screen. If a bit in the display memory is 1 then the bitmap graphics device turns on the corresponding, pixel on the display screen. If a bit in the display memory is 0, then the bitmap graphics device turns off the corresponding pixel on the display screen. By changing the contents of the display memory for instance, by loading a new bitmap, a computer program can effect a change on the display screen.

A computer program typically generates a bitmap in program memory, and then copies the bitmap to the display memory. Copying from program memory to display memory can be relatively time-consuming because bitmaps are often quite large and can contain one million or more bits. To improve performance and facilitate computer programming typical graphically-oriented operating systems provide routines that are optimized to copy bitmaps from program memory to display memory. These routines are known as bit block-transfer (bitBLT) routines.

In general, these bitBLT routines can read as input a source bitmap and a destination bitmap. which is typically in display memory. These bitBLT routines copy the source bitmap to the destination bitmap in an efficient manner because bitBLT routines are optimized to copy a computer word of data at a time, rather than just a single bit at a time. A computer word is a number of bits that the computer operates on as a unit which typically comprise 8, 16 or 32 bits.

In conventional graphical user interfaces, it is necessary for a graphics controller to combine these different bitBLT images so that a composite image can be produced for display on a display screen which is typically a cathode ray tube (CRT) or computer monitor. Simple examples of composite images are a cursor appearing, on top of the background display, or text being displayed on top of a motion video image. Similarly, a Windows™-based application displays composite images when running multiple windows concurrently. Multimedia display systems also produce composite images when overlaying real time video amongst other multimedia display images. All of these examples require complex processing because numerous comparisons must be evaluated with each refresh cycle to determine how to display the resultant composite image properly.

Conventional graphics controllers frequently hard code these image composition features into their processors. Therefore, these features work in a very limited number of ways, many times with the only programmability provided being the ability to turn a specific feature on or off. This hard coding approach does not offer much flexibility, and so problems arise when the mixing of images is sought to be accomplished differently than originally hard coded.

SUMMARY OF THE INVENTION

A need exists for flexibly forming composite image data in a manner that allows the processing of data to be altered depending on the desired result to be achieved. In particular, instead of implementing only specific image composition features in the way conventional systems do, the need exists for a design that allows virtually any combination of video composition features to be realized.

In accordance with the present invention a graphics controller is provided which produces a composite image through selecting between input image pixels, that are designated to be displayed in the same pixel location, by using a select function. The select function is computed on a pixel by pixel basis to provide a select signal which indicates which pixel should be chosen for display as the final composite image on the display screen. For example, the graphics controller uses the select function to select and send a color code of a cursor image, whose pixel location is designated as the same as that of a background image, to the appropriate pixel position on the display screen based on the select signal.

The select signal is generated in response to mixing keys which are functions for determining which image's pixel should be passed. The results are output in the form of key codes. In certain embodiments, the key codes are combined by performing a logical AND operation between each of the key codes, and with a Raster OPeration (ROP) code.

A mixing key may perform a comparison between two values, for example, and output a key code to indicate the result of the comparison, such as comparing if one value is greater than the other value. As an example of a comparison, a register value representing the color of a "background pixel" can be compared with a register value representing the color of a "graphics pixel" to determine if the values are equal. If this exemplary comparison results in a match in values, the mixing key outputs a key code value of 1 to indicate the values were equal, whereas if there is not a match, the key code has an output value of 0 to indicate the values did not equal each other, enabling selection of the "background pixel" or the "graphics pixel".

In addition to the mixing key example mentioned in the preceding paragraph, other mixing keys, specifying the results of other functions such as altering a pixel's value and comparing the altered pixel to an adjacent pixel value, are also taken into consideration by the select function. The select function combines the results of these mixing keys to form key code combinations. In certain embodiments of the present invention, the key codes of each combination are logically ANDed together to select an output pixel from a selected one of a plurality of input images. When the results of this logical operation equals 1, the pixel from a first image is passed, and when 0, a pixel from a second image is passed. Since there are multiple mixing keys, there are many possible key code combinations.

In order to provide much greater flexibility, the select function can be defined so that multiple combinations of key codes can be simultaneously considered. This selecting of key code combinations is achieved through the use of the ROP code which is a string of binary digits stored in a plurality of single bit registers according to embodiments of the present invention. The ROP code controls the selection of which key code combinations are computed by the selection function. These ROP code registers can hold a value of 1 or 0. Each ROP code register is associated with one key code combination. When the key codes of a combination are logically ANDed together, the ROP code register value is ANDed with that combination as well. In effect, the ROP code register is a flag or indicator that essentially performs a logical OR operation between key code combinations.

Thus, the select function equals 1 when any of the various key code combinations which have been flagged with a 1 in the ROP register returns a value of 1 after ANDing the key codes within the combination. When the select function equals 1, the select signal generator sends a select signal to a MUX so that the appropriate input pixel is passed for output.

The use of the ROP code determines how the select function uses the mixing key comparisons to offer much greater flexibility over traditional methods for generating the select function. The traditional method of defining a select function using only a hard wired set of mixing keys limited the number of select functions to $2^n$. For example, if there are four mixing keys, the prior art only allowed sixteen different ways of combing the mixing keys. By applying ROP codes to combine the key codes, a vastly greater number of possible functional combination is achieved. This provides for much greater programming flexibility than known methods because multiple key code combinations can be considered simultaneously.

Other features and advantages of the invention will be set forth in, or apparent from, the description of the preferred embodiments below.

BRIEF DESCRIPTIONS OF THE DRAWINGS

DESCRIPTION OF THE PREFERRED EMBODIMENTS

Figure 1:
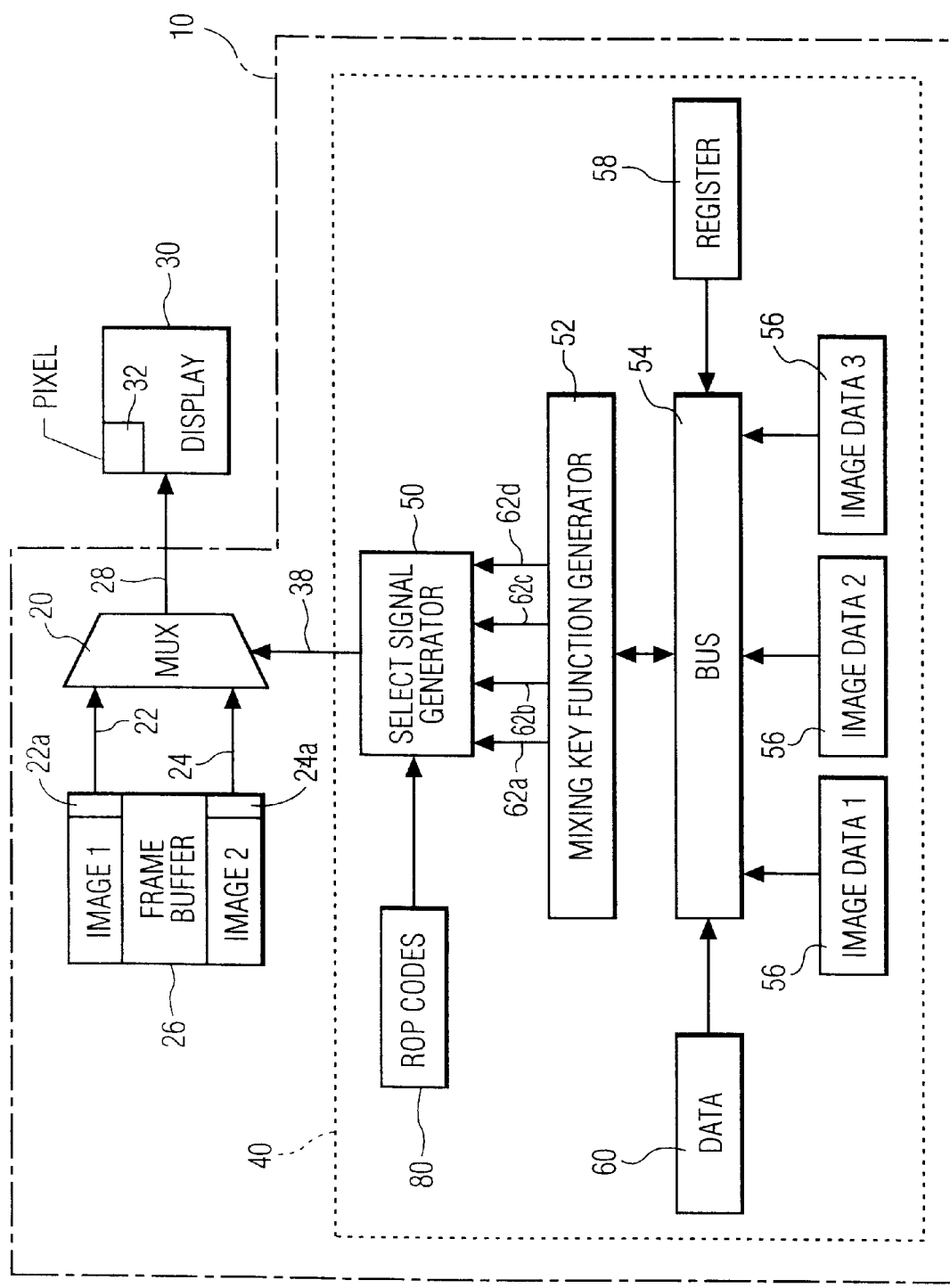
FIG. 1 is a schematic block diagram of a first embodiment of the graphics controller of the present invention.

FIG. 1 illustrates a graphics controller 10 that utilizes Raster Operation (ROP) codes to increase the flexibility in generating a select function which performs pixel selection. In general, the selection between input pixels from a pair of images is well known. As described below, the graphics controller 10 generates a select function based on simultaneous consideration of multiple key combinations to provide greater programming flexibility.

In FIG. 1, the graphics controller 10 is shown as comprising a multiplexer (MUX) 20 that receives a pair of input image signals 22 and 24 from a pair of pixels 22a and 24a from respective images stored in frame buffer 26. MUX 20 selects between input image signals 22, 24 and sends an output signal 28 to a display screen 30. The input signals 22, 24 have information pertaining to the location and color of input images that are to be mixed for display in the form of a final composite image. Display screen 30, which displays the composite image, can be any conventional display device such as a computer monitor, a cathode ray tube (CRT), an LCD display, etc. Display screen 30 has a plurality of picture elements (pixels) 32, each having a discrete location on display screen 30. Only one such pixel 32 is shown in the figures for convenience.

In addition to receiving input signals 22 and 24, MUX 20 also receives a select signal 38 from a select circuit 40. Select signal 38 provides MUX 20 with an indication as to which of the input signals 22 or 24 to pass as output signal 28. Select circuit 40 comprises select signal generator 50 that generates and outputs select signal 38 to MUX 20 based on supplied mixing keys from a mixing key function generator 52. Mixing key function generator 52 executes stored functions, on a pixel by pixel basis. The mixing keys may be based on any data such as a pixel value, the comparison of a pixel value with another value (e.g. another pixel or register value), the result of combining multiple pixels, a static register value, or virtually any information that is available to a system to which graphics controller 10 is connected. A bus 54 is connected to mixing key function generator 52 to carry this data or information from the data sources to the mixing key function generator 52. These data sources may include a plurality of image data sources 56, a register value 58, or other information in the form of data 60 (e.g., a clock signal or address information).

Mixing key function generator 52 obtains the requisite data or information from bus 54 to perform the various functions which are defined according to any comparison of values. Complete flexibility is available in defining functions. Any value can be processed according to a function. The outcome of the function is compared with a predefined to determine if the outcome is acceptable or not. Examples of these functions can be comparing two pixel color values or determining if a pixel value is within a specific color range. These functions are known as mixing keys. The functional result of a mixing key, may be for example, whether a color value falls within a specific range of values. Depending on the results of the data as operated on by the function, the resultant value has an output value of 1 or a 0 which is produced by the mixing key function generator as an individual key code 62.

An example of a common mixing key used in multimedia applications is the "color key". The color key generates a single bit result (e.g., key code 62a), for example of the comparison of a register value, such as that of register 58, with a pixel value such as that contained in 56. The common application of the color key is to compare a register value representing a "background color" at a particular pixel with a value of a "graphics pixel value" at that same pixel. In this case, if this comparison results in a match, a signal value of 1 may be assigned to the key code 62 which is output for that mixing key, whereas if there is no match the key code 62 is assigned a signal value of 0.

In addition to the color key/mixing key example mentioned above, other mixing keys 62, specifying the results of other comparisons, are also taken into consideration in the select signal generator 50. As discussed earlier, the mixing keys may represent numerous different types of information as is well known in the art. This includes a pixel value, a comparison of a pixel value, the result of combining multiple pixels, a static register value, etc.

The key codes 62a–d generated by the mixing key are single bit values specifying an acceptable outcome having a value of 1 or an unacceptable outcome having a value 0 that are logically combined using an AND operation to form a select signal that is either true (1) or false (0). In the prior art, this combining was normally limited to $2^n$ different combinations.

Figure 2:
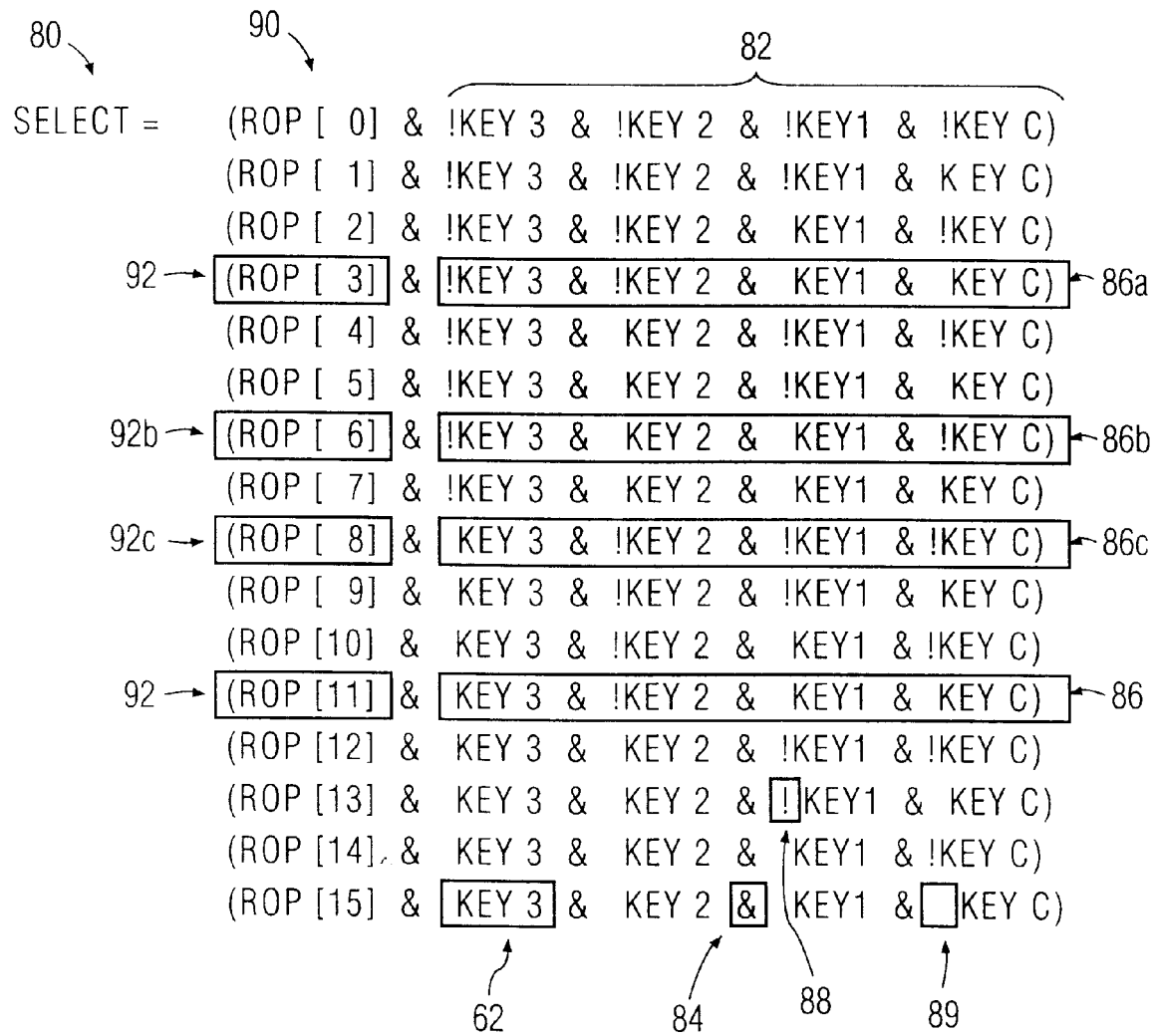
FIG. 2 is a diagram of an exemplary embodiment of a select function used in accordance with the graphics controller of the present invention.

FIG. 2 is a diagram illustrating a select function 80 programmed in VERILOG™, used by the select signal generator 50 to generate a select signal. The select signal generator 50 uses the select function 80 to generate select signal 38 used by MUX 20 to identify which input pixel 22 or 24 should be passed through MUX 20 and output as output signal 28. The output value of the select function 80 depends on the values of the individual key codes 62 input to the select signal generator 50.

In the embodiment of FIG. 2, select function 80 has multiple columns of mixing keys 82. Each mixing key 82 represents a key code 62 which is shown in FIG. 2 as one of Key 3, Key 2, Key 1, or Key 0. In the exemplary embodiment, the key code is a binary result which is represented in FIG. 2 with a "!" symbol (reference numeral 88) for "false" or 0 in front of the word "Key", and a "" (no symbol) 89 in front of the word "Key" indicating true, or a value of 1. As shown, there are 16 combinations of four different mixing keys 82 when each key code 62 has two possibilities if each combination has four mixing keys 82. Each of these sixteen possible combinations of mixing keys is referred to as a key code combination 86 referred to above.

The use of key code combinations 86 by themselves to select between a particular input pixel 22 or 24 in FIG. 1 is well known. In order to provide much greater flexibility, the present invention programs the select signal generator 50 to consider (i.e. logically combine) multiple key code combinations 86 simultaneously. Thus, if the logical combination of the selected key code combinations 86 returns a 1 the select function equals 1 and the appropriate select signal is sent indicating that input pixel from image 1 is to be passed. A return of a 0 as the result of the logical combination will cause the select function to equal 0 and select the input pixel from image 2.

In the present invention, the selection of key code combinations 86 that are logically combined by select function 80 is achieved through the use of a Raster OPeration (ROP) code 90. The ROP code 90 is a programmable value stored, for example, in a plurality of single-bit ROP code registers 92. Each ROP code register 92 stores a value, for example a 1 or 0, and is associated with a different one for the key code combinations 86. The ROP code register value associated with a particular key code combination 86 is logically ANDed with that key code combination 86. A ROP code register value of 1 enables the associated key code combination 86.

The enabled key code combination 86, indicated by the associated ROP code register values, are logically ORed together in exemplary embodiments of the invention. This allows the key code combinations 86 to be logically combined in over 65,000 different ways.

As a first example, assume that the ROP code 90 is set in the ROP code registers 92 to enable a single key code combination. Select function 80 in this case equals the result of logically ANDing ROP code 92 ("ROP[11]") with key code combination 86 ("_Key3 & !Key2 & _Key1 & _Key0"). Thus, if the result of Keys 3, 1, 0 equals 1, and the result of Key2 equals 0, ANDing these values makes the value of the key code combination 86 equals to 1. Since in this first example one bit 11 in the ROP code register 92 has a value of 1, this value ANDed with key code combination 86 also yields a value of 1. The value of the ORed combination of key code combinations 86 is therefore equal to 1. This value of 1 causes the select signal generator 50 to send an appropriate select signal 38 to inform MUX 20 to pass the input pixel associated with the value 1 (e.g. from image 1).

Instead of a single key code combination 86, assume that it is desired to select an image pixel based on a combination of multiple key code combinations 86. In that case multiple key code combinations 86 are simultaneously selected by storing 1's in a plurality of ROP code registers, such as 92a, 92b. 92c. Thus, if the value of ANDing ROP code 92a with key code combination 86a is 1, OR the value of ANDing ROP code 92b with key code combination 86b is 1, OR the value of ANDing ROP code 92c with key code combination 86c is 1. then select function 80 will equal 1. When select function 80 equals 1, select signal generator 50 sends select signal 38 to MUX 20 the value of 1 which designates, for example, that input image 24 is to be passed to display screen 30. The ROP code for this example is ROP[15:0]= 0000000101001000 in binary notation or 0148 in hexadecimal notation.

If all bits of ROP[15:0] were set to logic 0, then the select function would always be 0, and using the above example, input image 22 would be passed by MUX 20 to display 30. If all bits of ROP[15:0] were set to logic 1, then input image 24 would always be passed, regardless of the outcomes from the various mixing keys 82. A particular mixing key is disregarded (a "don't care") by choosing a pair of key code combinations 86 in which the value of the mixing key is 0 in the first key code combination 86, and 1 in the second key code combination 86.

The use of ROP code 90 determines how select function 80 combines the mixing key comparisons to offer much greater programming flexibility over traditional methods for generating the select function. The method of the present invention allows for many functions to be considered simultaneously in evaluating which pixel to select for display.

For example, traditional methods which combine n mixing keys are normally limited to $2^n$ combinations. However, by applying ROP codes according to the present invention, the number of possibilities for combining, mixing keys is $2^{2^n}$ where the number of key codes is n and the number of key code combinations is $2^n$ (if the key codes have only two possible outcomes). The ROP codes have a bit length of $2^n$.

Where the number n of mixing keys is 4, for example, the number of key code combinations is 16 and the total number of combinations is 65,563. The present invention is not limited to four mixing keys, but is also applicable to a greater or lesser number of mixing keys.

Figure 3:
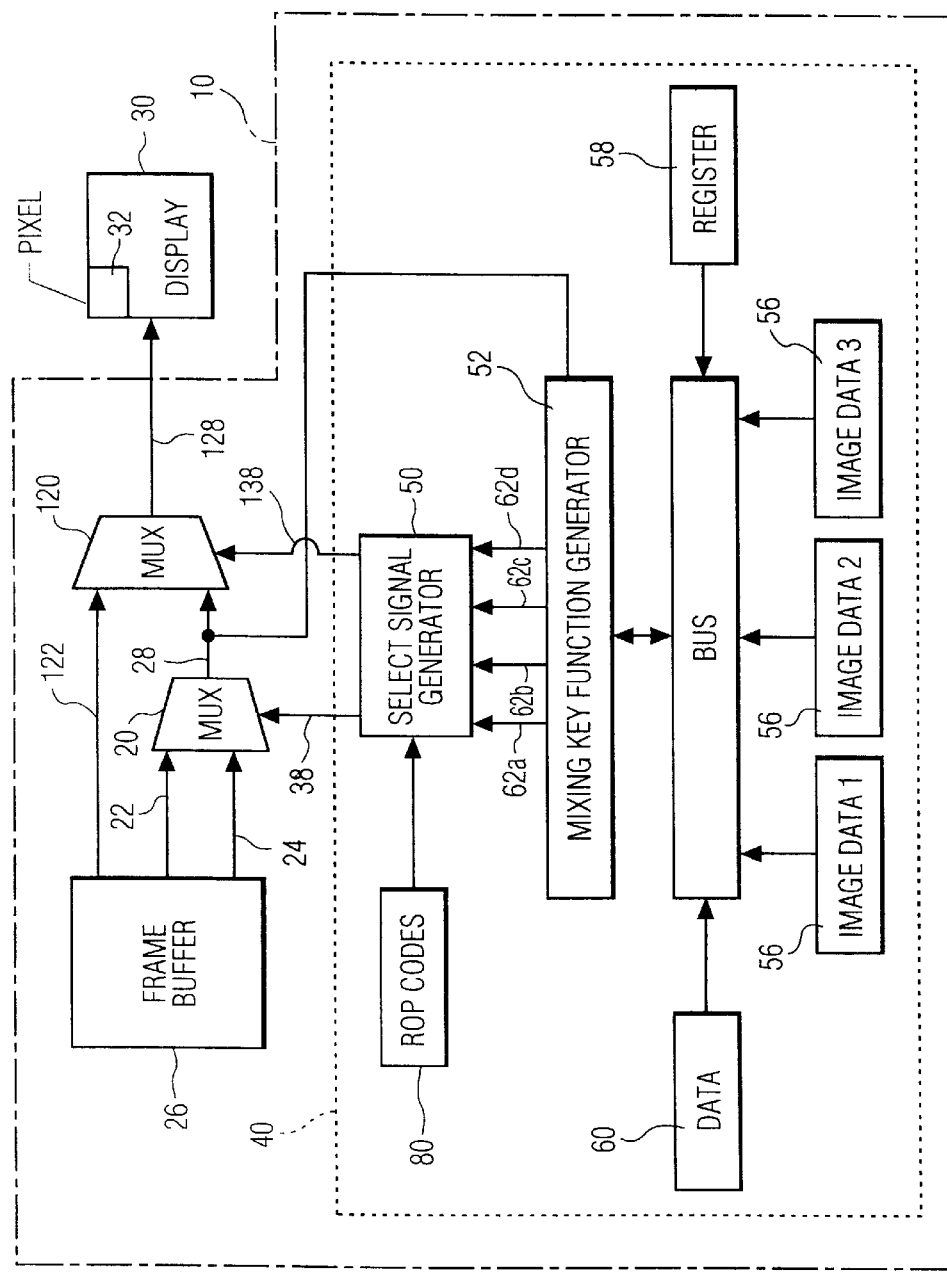
FIG. 3 is a schematic block diagram of a second embodiment of the graphics controller of the present invention.

FIG. 3 is a diagram of an alternative embodiment where a two-tiered multiplexer arrangement permits three images to be combined. The first MUX 20 selects between input images 22 and 24. A second MUX 120 receives the output 28 from first MUX 20 (i.e., either the first or second image data) and also receives the image data for a third image 122.

The operation of MUX 120 is similar to that described above in conjunction with the embodiment of FIG. 1 that selects between only two input image signals. In this instance though, MUX 120 is controlled by a different signal 138 which is generated from select signal generator 50 in a manner similar to the generation of select signal 38. It should also be noted that signal 28 output from MUX 20 can be used by mixing function generator 54 in the creation of key codes 62. For example, one of the mixing key functions used in generating the select signal 138 may be based on whether image 1 or image 2 was selected for a pixel in the first MUX 20. The configuration of FIG. 3 allows for additional flexibility even beyond that discussed above in determining how to properly display a composite image for display on display screen 30.

Although the present invention has been described in terms of specific exemplary embodiments, it will be understood by those skilled in the art that variations and modifications can be effected in these exemplary embodiments without departing from the scope and spirit of the invention.

What is claimed is:

1. A graphics controller for producing a composite image signal formed from a first image signal and a second image signal, the graphics controller comprising:

a multiplexer configured for selectively outputting to a display screen one of a first image signal and a second image signal based on a select signal, the first and second image signals each comprising information representing a corresponding pixel value for pixels of a display on the display screen; and a select signal generator for generating the select signal based on a logical combination of key codes and a raster operation (ROP) code, wherein a composite image is formed from said pixel values selected from the first and second image signals.

2. A graphics controller as claimed in claim 1 wherein said select signal generator comprises:

key code logic for selectively combining said key codes to produce a plurality of key code combinations; and combinatorial logic that logically ORs said key code combinations in accordance with one of said ROP codes to generate said select signal.

3. A graphics controller as claimed in claim 1 wherein the number of key codes is n, the number of key code combinations is $2^n$, the ROP codes have a bit length of $2^n$, and the number of combinations of key codes and ROP codes is $2^{2^n}$.

4. A graphics controller as claimed in claim 1 wherein at least one of said key codes is a result of a comparison between a first key value and a second key value, and said first key value is a first pixel value of said first image signal.

5. A graphics controller as claimed in claim 4 wherein said second key value is a second pixel value of said second image signal.

6. A graphics controller as claimed in claim 4 wherein said second key value results from a function to be applied to said first pixel value.

7. A graphics controller as claimed in claim 4 wherein said second key value results from a function to be applied to said first pixel value.

8. A graphics controller as claimed in claim 4 wherein said select signal is a single bit representation.

9. A graphics controller as claimed in claim 1, further comprising a second multiplexer that receives the output of the first multiplexer at a first input and a third image at a second input, and a select input that receives a second select signal, the second select signal being formed as function of a combination of key codes and a ROP code.

10. A graphics controller as claimed in claim 9, wherein one of said key codes represents which of the first or second images pixel values was selected at the first multiplexer for a particular pixel.

11. A graphics controller as claimed in claim 2, wherein each bit of a ROP code is logically ANDed with an associated different one of the key code combinations.

12. A method for forming a composite image on a display screen from image signal data, said method comprising:

receiving first and second image signals from a frame buffer;

generating a select signal from a select signal generator, comprising:

determining a plurality of mixing key values, combining said mixing key values to form a plurality of mixing key combinations, and logically combining the mixing key combinations in accordance with a raster operation (ROP) code to form a select signal to select between the first and second images; and performing a pixel mixing function between said first and said second image signals based on said select signal in forming said composite image to be displayed on said display screen.

13. A method as claimed in claim 12 further comprising storing the ROP code in a ROP code register.

14. A method as claimed in claim 12 wherein the first and second image signals are received into a first MUX, and the method further comprises outputting an output signal from the first MUX, receiving both a third image signal and the first output signal into a second MUX, and performing a further pixel mixing function between this first output signal and the third image signal in forming the composite image to be displayed on the display screen.

15. A method as claimed in claim 12 wherein the combining of the mixing key values further comprises performing a logical AND operation between the mixing key values.

16. A method as claimed in claim 15 wherein the logically combining of the mixing key combinations further comprises performing a logical OR operation between the mixing key combinations.

17. A method as claimed in claim 16 wherein performing the logical OR operation comprises performing a logical AND operation between the ROP code and the mixing key combinations to identify which of the mixing key combinations is utilized in forming the select signal.

* * * * *